(12) United States Patent
Fujimoto

(10) Patent No.: US 6,788,626 B2
(45) Date of Patent: Sep. 7, 2004

(54) OPTICAL RECORDING METHOD USING OPTICAL RECORDING MEDIUM CONTAINING NANOPARTICLES

(75) Inventor: Hiroshi Fujimoto, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 97 days.

(21) Appl. No.: 10/230,051

(22) Filed: Aug. 29, 2002

(65) Prior Publication Data

US 2003/0048700 A1 Mar. 13, 2003

(30) Foreign Application Priority Data

Aug. 31, 2001 (JP) .................................. P. 2001-263919

(51) Int. Cl.$^7$ ............................ G11B 11/00; B32B 3/00
(52) U.S. Cl. ................................... 369/13.38; 424/64.1
(58) Field of Search ........................ 369/13.38, 112.28, 369/112.27; 428/64.1, 64.4, 694 R, 694 ML, 694 SC

(56) References Cited

U.S. PATENT DOCUMENTS 5,024,927 A * 6/1991 Yamada et al. ............. 369/100
5,080,947 A * 1/1992 Yamada et al. ............. 428/64.4
5,641,606 A * 6/1997 Suzuki et al. ........... 430/270.13
6,071,587 A * 6/2000 Yoshinari et al. .......... 428/64.1
6,096,399 A * 8/2000 Yoshinari et al. .......... 428/64.1
6,226,258 B1   5/2001 Tominaga et al.
6,240,060 B1 * 5/2001 Kikitsu et al. ............ 369/275.1
6,359,852 B1 * 3/2002 Ueyanagi ..................... 369/118

FOREIGN PATENT DOCUMENTS

| EP | 1 058 247 A1 | 12/2000 |
| EP | 1 120 780 A2 | 8/2001 |
| JP | 5-62239 | 3/1993 |
| JP | 11-250493 | 9/1999 |
| JP | 2000-242969 | 9/2000 |

OTHER PUBLICATIONS

Patent Abstracts of Japan, JP-A-11-250493—Sep. 17, 1999.

* cited by examiner

Primary Examiner—George J. Letscher
Assistant Examiner—C. R. Magee
(74) Attorney, Agent, or Firm—Sughrue Mion, PLLC

(57) ABSTRACT

An optical recording method which comprises making a recording with near field light on an optical recording medium comprising a substrate having provided thereon a particle layer containing particles having an average particle size ranging from 1 to 50 nm.

5 Claims, 1 Drawing Sheet

OPTICAL RECORDING METHOD USING OPTICAL RECORDING MEDIUM CONTAINING NANOPARTICLES

FIELD OF THE INVENTION

The present invention relates to a recording medium represented by an optical disk using inorganic nanoparticles and nanoparticles of a metal chalcogen compound. More particularly, the invention relates to a recording medium used in an optical recording using near field light in order to increase recording density, and to a method for recording the same. The term "nanoparticles" as used herein means ultrafine particles having an average particle size ranging from 1 nm to 50 nm.

BACKGROUND OF THE INVENTION

Densification and sensitization of optical recording materials have extensively been improved. Laser beams having a wavelength of 600 nm or more have hitherto been used, and recording media have also been developed and designed so as to exhibit the optimum performance within this wavelength region. It is well known that a reduction in the wavelength of light to one nth results in an n×n-fold increase in the recording density of information. It has therefore been advanced to study high-density recordings using short-wave lasers having a wavelength of about 400 nm. However, when the use of a laser having a shorter wavelength is attempted for making a higher density recording, it becomes impossible to maintain optical transparency of the recording media themselves. Further, even when an increase in NA is intended, it becomes difficult to form a recording mark of 100 nm or less because of the diffraction limit of light.

In recent years, in order to achieve high-density recordings exceeding the diffraction limit of light, recording methods utilizing near field light have been proposed. However, as the near field light is away from its generation source, its optical intensity is exponentially decreased. It is therefore necessary to use various amplification functions in combination. For example, it has been known that the shape or material of a near field light probe is selected, or that it is coated with a metal to utilize the coupling with metal surface plasmon. On the other hand, as a method of giving the function to the recording medium side, a method of arranging on an upper portion of a recording layer a mask layer in which a minute opening can be formed by light, as described, for example, in Japanese Patent Laid-Open Nos. 250493/1999 and 242969/2000, and utilizing near field light generated therefrom. Further, it has been studied that the use of silver oxide in this mask layer locally develops metallic silver to generate local plasmon there, thereby amplifying optical intensity.

However, all of the above are directed to improvements from the viewpoint of the generating method of near field light or the amplification of optical intensity, and in other words, techniques for allowing them to reach the optical intensity of the recording media. However, these alone do not necessarily give sufficient intensity. That is to say, these do not have the viewpoint of increasing the sensitivity to light of the recording medium side.

On the other hand, as a technique using fine particles in a recording medium, Japanese Patent Laid-Open No. 62239/1993 discloses a technique using ultrafine semiconductor particles of Ge or Si formed by spattering and having a particle size distribution. This technique intends to make a wavelength multiple recording utilizing the difference in quantum size effect between the ultrafine particles different in size, in order to improve recording density without depending on shortening of the wavelength of a laser or an increase in NA, and is basically different from the invention in which the optical sensitivity of an energy-irradiated portion is improved using homogeneous nanoparticles.

SUMMARY OF THE INVENTION

An object of the invention is to efficiently form a recording mark with a reduced size, for making a high-density optical recording.

Another object of the invention is to provide a recording medium with which a high-density optical recording can be made.

A still other object of the invention is to provide a recording method realizing a high-density optical recording.

Other objects and effects of the invention will become apparent from the following description.

The above-described objects of the invention have been achieved by the following embodiments.

1) An optical recording method which comprises:
   making a recording with near field light on an optical recording medium comprising a substrate having provided thereon a particle layer containing particles having an average particle size ranging from 1 to 50 nm;

2) The optical recording method according to the above embodiment 1), wherein the particle layer is a recording layer and the particles comprising particles of a metal chalcogen compound;

3) The optical recording method according to the above embodiments 1) or 2), wherein the particle layer of the optical recording medium is arranged 5 nm to 100 nm apart from a generation source of near field light, and a heat-resistant protective layer is provided on the particle layer as a layer closer to the generation source of near field light to give multiple layer constitution;

4) The optical recording method according to any one of the above embodiments 1) to 3), wherein the recording is carried out using a recording unit comprising a recording head having integrated therein a plurality of probes for generating near field light, and a part of the recording head is brought substantially in contact with the optical recording medium;

5) The optical recording method according to any one of the above embodiments 1) to 4), wherein the particles are monodisperse particles;

6) The optical recording method according to any one of the above embodiments 1) to 5), wherein the particle layer is formed by coating.

Figure 1:
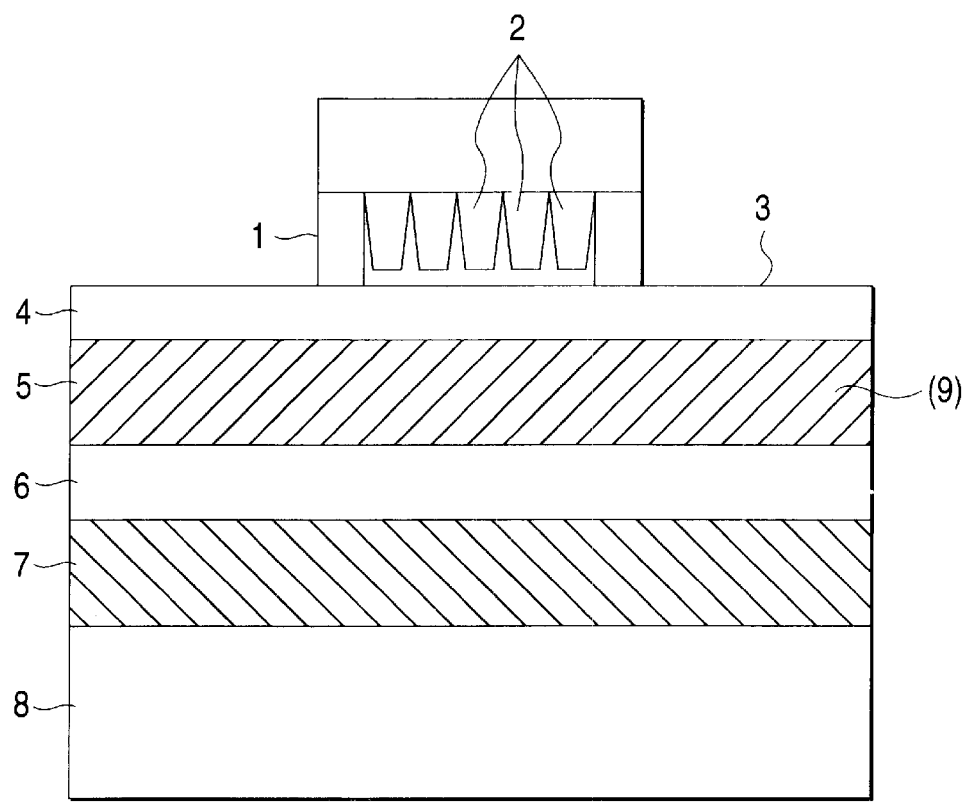
FIG. 1 is a sectional view showing an arrangement example of a recording head of near field light probes and an optical recording medium upon recording.

Reference numerals indicated therein denote the followings respectively.

1: Contact head
2: Near field light probes
3: Lubricant
4: Protective layer of optical recording medium
5: Recording layer of optical recording medium
6: Dielectric layer of optical recording medium
7: Reflective layer of optical recording medium 8: Substrate of optical recording medium
9: Ultrafine particle layer of optical recording medium

DETAILED DESCRIPTION OF THE INVENTION

For the near field light probe heads, various forms are known, and all of them can be used in the invention. Examples thereof include a semiconductor-containing one of a floating slider system described in Japanese Patent Laid-Open No. 255320/1998, a plane probe head described in Japanese Patent Laid-Open No. 149303/2000, one having a shape thought out to enhance metal plasmon, which is described in Japanese Patent Laid-Open No. 67668/2001 or 23172/2000, and the like. In the invention, it is preferred that the recording unit has a recording head into which a plurality of probes for generating near field light is integrated. It is more preferred that a semiconductor laser oscillator is contained in a head portion and the head is an array type contact head in which the probes are disposed two-dimensionally. Writing with near field light generally suffers from the problem of a slow rate. However, for example, the two-dimensional arrangement of about 100 to about 1000 micro arrays can ensure a high transfer rate. The near field light is generally weak in optical intensity, so that it is important to coat a tip of a probe with a metal to couple it with surface plasmon. The metal coat is preferably applied to a condensing prism portion of the probe tip. However, it is necessary to devise to remain a partial surface of the tip prism uncoated, according to the shape of the probe, thereby increasing the condensing degree of the near field light. Although the near field light is preferably generated from the tips of these micro arrays, it is preferred that the wavelength of a laser beam from the laser oscillator contained is as short as possible. For example, a 405-nm bluish purple semiconductor laser is preferred.

In general, as the near field light is away from its generation source, its optical intensity is exponentially decreased. Accordingly, the particle layer of the invention is preferably arranged 5 nm to 100 nm apart from a generation source of the near field light. For example, in the case that the output of the above-mentioned micro array head is established within the practical range, when the above-mentioned clearance is more than 100 nm, it becomes difficult to give heat necessary for a phase change of the recording layer. Conversely, when the above-mentioned clearance is less than 5 nm, the probability that the tips of the probes are damaged by the contact with the recording medium and the like increases to become unpractical. In order to stably maintain this clearance, it is preferred that the head is disposed on a pedestal, legs of which are adjusted so as to be able to come into contact with a surface of the recording layer. The surface of the medium is preferably covered with an extremely thin lubricant. For example, fluorine oil such as perfluoropolyethyldiol is preferred. The film thickness of the lubricant is preferably from 1 nm to 10 nm.

As another method for generating the near field light, there is known, for example, a so-called super lens system in which a mask layer is provided in an optical recording layer, minute openings are formed with a propagation light laser, and the near field light is generated therefrom, as described in Japanese Patent Laid-Open No. 250493/1999, 229479/2000 or 242969/2000.

The invention is also preferably used in this system. For example, the use of a recording layer containing nanoparticles under the mask layer makes it possible to effectively increase the sensitivity.

In order to make a high density recording, methods using a near field light recording have hitherto been variously studied. However, it has been unexpected that the use of nano-sized particles in the recording layer specifically results in sensitization in the near field light recording, which makes it possible to obtain good signals. That is to say, although the present inventors have already discovered that the use of nano-sized particles in the recording layer achieves sensitization to some degree in recordings by general propagation light, the inventors have now discovered that a more effective recording is possible when the near field light extremely high in the decay of optical intensity is used.

The nanoparticles will be described in detail below.

The particle size of the nanoparticles used in the invention is from 1 to 50 nm on average, preferably from 1 to 20 nm, and more preferably from 1 to 10 nm. When the average particle size is larger than 50 nm, the melting point is elevated in the recording layer to decrease the phase change rate. The lower limit of the size is selected considering practical performance such as weather resistance. So-called monodisperse particles are good in differentiation between a recorded area and an unrecorded area. The term "monodisperse particles" as used in the invention means particles having a coefficient of variation of preferably 30% or less, more preferably 20% or less, most preferably 10% or less.

In order to obtain a colloid comprising a nanoparticle dispersion used in the invention, it is important to modify surfaces of the nanoparticles with an adsorptive compound (adsorptive group-containing compound). As the adsorptive compound, effective is an alkylphosphine oxide, an alkylphosphine, a compound containing —CN, —NH$_2$, —SO$_2$OH, —SOOH, —OPO(OH)$_2$ or —COOH, or the like. Of these, the alkylphosphine oxide or the compound containing —SH or —COOH is preferred. An anionic surfactant can also be used. In a lipophilic dispersion, an adsorptive compound having a substituent group having 6 or more carbon atoms in total, preferably 8 to 40 carbon atoms, such as octyl, dodecyl or hexadecyl, is used. Further, in a hydrophilic dispersion, an adsorptive compound having a substituent group having 6 or less carbon atoms or a hydrophilic group (for example, —SO$_3$M or —COOM [wherein M represents a hydrogen atom, an alkali metal atom, an ammonium molecule or the like]) is preferable used. A thin film formed by aggregation of such surface-treated, that is to say, dispersed fine particles can be by no means realized by sputtering or vapor deposition.

It can be confirmed by existence of a definite clearance between particles under a high resolution TEM such as a FE-TEM and chemical analysis that the surfaces of the nanoparticles are treated with the adsorptive compound.

The nanoparticle colloid of the invention is applied by spin coating or web coating. Film formation by coating reduces plant and equipment investment and production cost.

The metal chalcogen compound used in the recording layer is preferably one comprising: at least one of the group 8, 1B and 2B elements and the group 3B, 4B and 5B elements of 4 to 6 periods; and at least one of the group 6B elements (O, S, Se, Te and Po). Specifically, they include GeSbTe, AgInSbTe, GeTe, Ag$_2$Te, AgInTe$_2$, AgSbTe$_2$, CuInSe$_2$, CuInTe$_2$, AgSbTe, InSbTe, GeTeS, GeSeS, GeSeSb, GeAsSe, InTe, SeTe, SeAs, GeTeAu, GeTeSeSb, GeTeSnAu, GeTePb, GeTeSbS and the like. Particularly preferred are any one of GeSbTe, AgInSbTe, GeTe, Ag$_2$Te, AgInTe$_2$, AgSbTe$_2$, CuInSe$_2$ and CuInTe$_2$. Although the atomic ratios are all indicted by integers, they are not necessarily limited thereto and can also be deviated from integral ratios, in order to obtain characteristics such as desired recording characteristics, keeping quality and strength.

The nanoparticles of the metal chalcogen compounds can be synthesized by various methods. For example, they are synthesized by adding a precursor solution in which the above-mentioned elements are dissolved in an alkylphosphine or the like in the ultrafine simple substance particle form or the salt form, to a high boiling organic solvent such as an alkylphosphine oxide, and allowing them to react within the temperature range from 100° C. to 350° C. The precursor means a reactant containing the above-mentioned each element necessary for forming the metal chalcogenide, and the precursor containing the metal of the above-mentioned each group and the precursor containing the chalcogen are used.

The alkylphosphines include symmetrical tertiary phospines such as tributyl, trioctyl and triphenyl, and asymmetrical phosphines such as dimethylbutyl and di-methyloctyl. They can be used either alone or in combination. However, tributylphosphine (TBP) and trioctylphosphine (TOP) are particularly preferred. Further, ones may be used in which the alkyl groups are appropriately substituted by various functional groups (see examples in the following hydrocarbons).

The high boiling organic solvents which can be used include alkylphosphine oxides, straight-chain or branched hydrocarbons (usually having 8 to 22 carbon atoms) having functional groups (—SH, —SO$_2$OH, —SOOH, —OPO(OH)$_2$, —COOH, etc.) for modifying the surfaces of the nanoparticles, and fluorocarbons. Further, dodecyl ether, didodecyl ether, phenyl ether and n-octyl ether can also be preferably used. As the alkylphosphine oxides, there can be used tributyl, trioctyl, dibutyloctyl and the like. Most preferred is trioctylphosphine oxide (TOPO).

For allowing a solution of the precursor containing at least one of the group 8, 1B and 2B elements and the group 3B, 4B and 5B elements of 4 to 6 periods with a solution of the precursor of at least one of the group 6B elements to form a nanoparticle colloid, the reaction is preferably conducted at a temperature of 100° C. to 350° C. under an atmosphere of an inert gas. Here, the total mole number of the 6B element is preferably from 0.5% to 0.001%, and more preferably from 0.2% to 0.005%, based on the weight of the high boiling organic solvent. A temperature or concentration range lower than the above-mentioned conditions results in very low particle formation speed or no formation of nanoparticles. Further, a higher temperature or concentration range results in formation of coarse particles or impossibility of re-dispersion due to aggregation of formed particles.

In order to aggregate and precipitate the nanoparticles of the metal chalcogen compound from the above-mentioned reaction solution, methanol or ethanol is usually added. After the supernatant is decanted, the nanoparticles are re-dispersed in a solvent such as an aprotic hydrocarbon (n-hexane etc.). The surface modifier (adsorptive compound) for the nanoparticles can be added in either course of nanoparticle formation or purification.

According to another synthesis method, a colloid having any composition can be obtained by dissolving a salt of the precursor containing at least one of the group 8, 1B and 2B elements and the group 3B, 4B and 5B elements of 4 to 6 periods, for example, an acetate, a nitrate, a chloride or a bromide, in an aqueous solution of L-tartaric acid, and reducing it with a strong reducing agent such as sodium borohydride. In this case, a dispersing agent such as polyvinyl pyrrolidone is preferably added. In particular, when tellurium is added, telluric acid or potassium tellurite is preferably used as a tellurium source. Sodium tellurate is also preferably used in some cases.

As the dispersing agent, one containing an adsorbent such as a mercapto group-containing compound, as well as polyvinyl pyrrolidone described above, is particularly preferred, or a method of protecting the colloid with a coating film formed by dehydration polymerization after adsorbing an inorganic material such as silica is particularly preferred. In this case, the amount of the adsorbent used is as small as possible.

The synthesized colloid is desalted by ultrafiltration or the like, and concentrated to obtain a 1 to 5% colloid. In this case, it is preferred in respect to handling that water or a mixed solvent of water and an alcohol is used as the solvent. As the alcohols, there are preferably used low boiling alcohols such as methanol and ethanol, and alcohols having a somewhat high boiling point such as 1-ethoxy-2-propanol and ethoxyethanol.

The colloid obtained above is applied onto a substrate such as a polycarbonate with a coater such as spin coater. In that case, it is necessary to dispose a dielectric layer or a reflective layer as needed. Although the thickness of the coating layer is correlated to the particle size of the ultrafine particles for the recording layer, it can be designed within the range of 5 to 300 nm. It is preferably from 5 to 200 nm, more preferably from 5 to 100 nm and most preferably from 5 to 50 nm. In the recording layers, various slightly decomposable organic binders such as fluorine polymers and silicone polymers or various dielectric nanoparticles such as ZnS, SiO$_2$ and TiO$_2$ can be used together to improve physical strength and repeating resistance of recording and reproduction.

For the layer constitution of the recording medium of the invention, it is preferred that the reflective layer, the dielectric layer, the recording layer and the protective layer are arranged on the substrate. Alternatively, it is preferred that the reflective layer, the dielectric layer, the recording layer and the dielectric layer are arranged on the substrate, or that the reflective layer, the recording layer, the protective layer and/or the dielectric layer are arranged on the substrate. In particular, the protective layer disposed on the recording layer preferably has heat resistance. The material of the protective layer is preferably difficult to expand or decompose by heat from the recording layer. In particular, it is preferred that the protective layer is optically transparent.

When the mask layer is provided, it is preferred that the reflective layer, the dielectric layer, the recording layer, the mask layer, the protective layer and/or the dielectric layer are arranged on the substrate, or that the reflective layer, the dielectric layer, the mask layer, the dielectric layer, the recording layer, the dielectric layer, the mask layer, the dielectric layer and the protective layer are arranged on the substrate, or that the reflective layer, the recording layer, the mask layer, the protective layer and the like are arranged on the substrate.

The thickness of the above-mentioned protective layer is preferably 50 nm or less (the layer may not be provided in some cases). In order to change a heat mode (for example, a function as the phase change material), the nanoparticles of the particle layer are required to melt within an irradiation time by energy of the near field light. The nanoparticles of the invention have a size of 1 nm to 50 nm, particularly preferably 1 nm to about 10 nm. It is therefore expected that the melting point is lowered by about 100° C. to about 300° C. compared to a conventional sputtered film, by the depression of melting point due to the surface effect. This effect seems to remarkably increase the sensitivity.

Inorganic dielectric nanoparticles whose surfaces are modified with the adsorptive compound are used in the dielectric layer of the invention. Such inorganic dielectrics include ZnS, $SiO_2$, $TiO_2$, $Al_2O_3$, AlN, SiC, silicon nitride, $MgF_2$, $CaF_2$, LiF, SiO, $Si_3N_4$, ZnO, MgO, CeO, SiC, ZrO, $ZrO_2$, $Nb_2O_5$, $SnO_2$, $In_2O_3$, TiN, BN, ZrN, $In_2S_3$, $TaS_4$, MgS, CaS, TaC, $B_4C$, WC, TiC, ZrC and the like. In particular, the nanoparticles of $SiO_2$, $TiO_2$, $Al_2O_3$, ZnO, $MgF_2$, $CaF_2$, LiF, SiO and the like can be used together. A nanoparticle mixture of ZnS and $SiO_2$ is most preferred.

The ZnS nanoparticles whose surfaces are modified with the adsorptive compound can be obtained by mixing a solution of a zinc salt (for example, zinc sulfate, zinc acetate, zinc nitrate, zinc hydrochloride, etc.) and a solution of a sulfide (for example, sodium sulfide, potassium sulfide, ammonium sulfide, etc.). In order to decrease the size of the ZnS nanoparticles, the amount of water contained in a reaction solvent is preferably as small as possible, desirably 10% by weight or less, and more desirably 5% by weight or less. In order to remove a salt of a by-product or an excess of the adsorptive compound, the particles may be centrifuged and re-dispersed in a desired lipophilic or hydrophilic dispersing medium. In this case, a different adsorptive compound may be used. An aqueous dispersion is obtained by producing the ZnS nanoparticles as described above using a slightly aqueous-miscible solvent (for example, n-heptane, n-octane, isooctane, 3-methylheptane, ethyl acetate, methyl ethyl ketone, etc.), and then mixing them with water containing the water-soluble adsorptive compound, followed by solution separation to taken out an aqueous phase.

Various dispersions of the nanoparticles of $SiO_2$, $TiO_2$, $Al_2O_3$, ZnO and the like are commercially available, and they can be used. When ZnS is used in combination with the above-mentioned inorganic dielectric, the mixing ratio thereof can be arbitrarily established. However, it is preferably from 98:2 to 20:80 by weight ratio.

The reflective layers may be composed of high reflective metals such as simple substances such as Au, Ag, Al, Pt and Cu, or alloys each containing one or more of them. In particular, the metal of either Ag or Al, or the alloy mainly composed of it is preferred. The film thickness is preferably from 30 to 300 nm, and particularly preferably from 50 to 200 nm. The materials for the reflective layers can also be converted to nanoparticle colloids, and can each be applied.

Examples of materials used in the protective layer include inorganic materials such as SiO, $SiO_2$, $MgF_2$, $SnO_2$ and $Si_3N_4$, and organic materials such as a thermoplastic resin, a thermosetting resin, an UV-curing resin and amorphous carbon. A heat insulating protective layer can also be provided between the recording layer and the reflective layer.

The protective layer can be formed, for example, by laminating the reflective layer and/or the substrate with a film obtained by extrusion of a plastic through an adhesive layer. Alternatively, the protective layer may be provided by a method such as vacuum vapor deposition, sputtering or coating. In the case of the thermoplastic resin or the thermosetting resin, the protective layer can also be formed by dissolving the resin in an appropriate solvent to prepare a coating solution, and then, applying the resulting coating solution, followed by drying. The thickness of the protective layer is preferably from 0.1 to 100 μm, more preferably from 0.1 to 50 μm, and most preferably from 1 to 20 μm.

EXAMPLES

The present invention will be illustrated in greater detail with reference to the following Examples, but the invention should not be construed as being limited thereto.

Example 1
Preparation of Colloid Composed of Ag—In—Sb—Te and Evaluation of Recording:

| | |
|---|---|
| 50 mM Aqueous solution of antimony acetate containing 3% L-tartaric acid | 200 ml |
| 50 mM Aqueous solution of indium acetate containing 3% L-tartaric acid | 10 ml |
| 100 mM Aqueous solution of silver nitrate | 5 ml |
| 4% Aqueous solution of polyvinyl pyrrolidone (average molecular weight: 13000) | 100 ml |
| NaOH (5 N) | 16 ml |
| $NaBH_4$ (a 2 M aqueous solution) | 50 ml |
| 50 mM aqueous solution of sodium telluride | 60 ml |

After stirring for 1 hour, a solution having the above-mentioned composition was desalted by ultrafiltration to obtain a colloidal solution having a concentration of 1% by weight.

In the above-mentioned synthesis, oxygen was removed from the raw materials, and the reaction was also wholly conducted in an environment from which oxygen was removed. As a result, the average particle size of the resulting nanoparticles was 5 nm, and the coefficient of variation thereof was 5%. It was confirmed under an EF-TEEEM that Ag, In, Sb and Te were present as a mixture in one particle at a composition ratio of 1:1:20:7.

A 0.6-mm thick polycarbonate disk substrate was sputtered with Al/Ti at a weight ratio of 98.5/1.5 to form a reflective layer having a thickness of 100 nm, and further sputtered with $ZnS/SiO_2$ at a weight ratio of 8/2 to form a dielectric layer having a thickness of 50 nm. The colloidal solution prepared above was applied thereon with a spin coater, followed by vacuum drying to form a recording layer. Subsequently thereon, a dielectric layer having the same composition as described above was formed by sputtering so as to give a thickness of 5 nm. Further, an amorphous carbon film was formed as a protective layer by sputtering so as to give a thickness of 5 nm, thus preparing test disk 1.

Then, comparative disk 1 was prepared in the same manner as with test disk 1 with the exception that in place of the above-mentioned colloid coating, a target having Ag, In, Sb and Te with a composition ratio of 1:1:20:7 was used, and sputtering was carried out so as to give the same amount as the amount coated.

Test disk 1 and comparative disk 1 prepared above were initialized using an 808-nm wavelength semiconductor laser. As for the conditions, the irradiation power was 0.3 W, and the rotational speed was 4 m/second.

In a near field recording method, there was used a near field microscope for simplicity. Using a specialized probe in which a tip thereof having a 50-nm opening was coated with a silver film by metal vapor deposition, and using a 405-nm wavelength semiconductor laser as oscillation laser, the recording performance of the disks prepared above was evaluated by changing the laser power. The laser power was controlled by standardizing as 1 the output at the time when the CNR of the disk of the sputtered film at 3T showed 40 dB. The size of a recording mark was measured under a TEM. The recording conditions and the results are shown in Table 1.

TABLE 1

| Kind of Disk | Laser Power | CNR of 3T | Pit Size (shorter side) |
| --- | --- | --- | --- |
| Comp. disk 1 | 1 (standardization) | 38 dB | 95 nm |
| Comp. disk 1 | 0.8 | 32 dB | 89 nm |
| Comp. disk 1 | 0.7 | 28 dB | 85 nm |
| Comp. disk 1 | 0.6 | 15 dB | 71 nm |
| Test disk 1 | 1 | 42 dB | 95 nm |
| Test disk 1 | 0.8 | 38 dB | 88 nm |
| Test disk 1 | 0.7 | 37 dB | 82 nm |
| Test disk 1 | 0.6 | 34 dB | 70 nm |
| Test disk 1 | 0.5 | 31 dB | 62 nm |

As known from Table 1, when the colloid film is used, recording is possible even at a lower laser power, compared to the case that the recording layer is the sputtered film, resulting in increased sensitivity. As for the recording mark size, it is known that the colloid type can record a smaller mark.

Example 2

Preparation of Ge—Sb—Te Colloid and Evaluation of Recording:

A colloid was prepared in the same manner as in Example 1 with the exception that germanium chloride was used in place of silver nitrate and indium acetate used in Example 1, and the mixing ratio of Ge, Sb and Te was adjusted to 2:2:5. The average size of the particles was 8 nm.

The above-mentioned colloid was applied as a recording layer in the same manner as in Example 1 to prepare test disk 2. On the other hand, a target was prepared so as to give a GeSbTe ratio of 2:2:5, and a recording layer was formed by sputtering to prepare comparative disk 2.

Initialization was carried out with a 808-nm wavelength laser. Micro probes whose tips contain semiconductor lasers and have 50-nm openings were prepared, and a pedestal was attached thereto, thereby forming a recording head. The clearance to a recording medium produced by the probe tips and legs of the pedestal was 10 nm. Further, a surface of the recording medium was covered with a thin lubricant, and the above-mentioned recording head was disposed so as to slide on a surface of the rotary disk.

The sensitivity was evaluated, and the pit size was evaluated under a TEM, in the same manner as in Example 1. The results showed that when the recording layer was prepared by the colloid, recording was possible even at a lower laser power, compared to the case that the recording layer was prepared by sputtering, and writing was possible even at a higher rotational speed of the disk, resulting in increased sensitivity. The pit size was 60 nm for the comparative disk, and 50 nm for the test disk of the colloid.

Example 3

Recordings were made on the disks prepared in Example 1, by the recording method using the contact head of Example 2, and the evaluations were carried out similarly. The results showed that the recording pits formed marks having a size of 50 nm, and further, the damage of the recording head was significantly decreased compared to Example 1, thus always obtaining stable signals. Even when the recording was repeated, the damage of the recording media was decreased.

According to the invention, there is provided a recording method of efficiently forming a recording mark with a reduced size, for making a high-density optical recording.

While the invention has been described in detail and with reference to specific examples thereof, it will be apparent to one skilled in the art that various changes and modifications can be made therein without departing from the spirit and scope thereof.

What is claimed is:

1. An optical recording method which comprises:

making a recording with near field light on an optical recording medium comprising a substrate having provided thereon a particle layer containing particles having an average particle size ranging from 1 to 50 nm, wherein the particle layer of the optical recording medium is arranged 5 nm to 100 nm apart from a generation source of near field light, and a heat-resistant protective layer is provided on the particle layer as a layer closer to the generation source of near field light to give multiple layer constitution.

2. The optical recording method according to claim 1, wherein the particle layer is a recording layer and the particles comprising particles of a metal chalcogen compound.

3. The optical recording method according to claim 1, wherein the recording is carried out using a recording unit comprising a recording head having integrated therein a plurality of probes for generating near field light, and a part of the recording head is brought substantially in contact with the optical recording medium.

4. The optical recording method according to claim 1, wherein the particles are monodisperse particles.

5. The optical recording method according to claim 1, wherein the particle layer is formed by coating.

* * * * *